（12) United States Patent
Hawkins

(10) Patent No.: US 7,747,604 B2
(45) Date of Patent: Jun. 29, 2010

(54) DYNAMIC SITEMAP CREATION

(75) Inventor: Jonathan C. Hawkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/868,311

(22) Filed: Oct. 5, 2007

(65) Prior Publication Data

US 2009/0094199 A1   Apr. 9, 2009

(51) Int. Cl.
    *G06F 17/30* (2006.01)
(52) U.S. Cl. .................. 707/709; 707/711; 707/741
(58) Field of Classification Search ............ 707/3, 707/709, 711, 741; 709/252
    See application file for complete search history.

(56) References Cited

U.S. PATENT DOCUMENTS

| | | | |
|---|---|---|---|
| 6,035,330 | A | 3/2000 | Astiz et al. |
| 6,470,383 | B1 * | 10/2002 | Leshem et al. ............ 709/223 |
| 6,957,383 | B1 | 10/2005 | Smith |
| 7,599,920 | B1 * | 10/2009 | Fox et al. ............ 707/3 |
| 2004/0153972 | A1 | 8/2004 | Jaepel et al. |
| 2006/0070022 | A1 | 3/2006 | Ng et al. |
| 2007/0124506 | A1 * | 5/2007 | Brown et al. .......... 709/252 |

FOREIGN PATENT DOCUMENTS

| KR | 10-2002-0079219 | 10/2002 |
|---|---|---|
| KR | 10-2006-0067434 | 10/2006 |

| WO | 2007-027469 | 3/2007 |
|---|---|---|

OTHER PUBLICATIONS

ASP.NET Futures (May 2007): Enabling Search Sitemaps with ASP. NET AJAX http://quickstarts.asp.net/Futures/services/doc/searchsitemaps.aspx.
SiteMap XML Dynamic Site Map Generator 1.0 http://sitemap-xml-dynamic-sitemap-generator.softswot.qarchive.org/.
Building and Consuming a Dynamic Sitemap in ASP.Net 2.0 http://www.codeproject.com/useritems/DynamicSitemapASPNET2.asp.
Dynamic Data aids SEO http://www.bigmouthmedia.com/live/articles/dynamic-data-aids-seo.asp/3289/.
Xtreeme SiteXpert http://www.xtreeme.com/sitexpert/.
Site Map for Zen Cart—Zen Cart Module 1.0 http://www.fileflash.com/program/17802/.
Sitemaps XML format http://www.sitemaps.org/protocol.php.

* cited by examiner

*Primary Examiner*—John R. Cottingham
*Assistant Examiner*—Sherief Badawi
(74) *Attorney, Agent, or Firm*—Wokman Nydegger

(57) ABSTRACT

The present invention extends to methods, systems, and computer program products for dynamic sitemap creation. Embodiments of the present invention facilitate the placement of executable code behind a Sitemap feed. The executable code is configured to access objects from a data source (e.g., database, other data collection, Web service, etc.) and translates the objects into XML for inclusion in a Sitemap. Sitemap properties can be included in a configuration file and/or in a derived class and preserved within Sitemap entries. Thus, a Sitemap can be created directly and automatically from data at a data source. Accordingly, a Sitemap can be created without having to manually re-enter data from the data source into the Sitemap.

16 Claims, 2 Drawing Sheets

DYNAMIC SITEMAP CREATION

CROSS-REFERENCE TO RELATED APPLICATIONS

N/A.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system. A request for content is typically in the form of a Uniform Resource Locator ("URL"). A URL includes (among other data) a domain portion that identifies the organization controlling requested content and a path portion that indicates the location of the content within a namespace of the organization.

The domain portion of the URL is resolved to a Web server under the control of the organization. The path portion of the URL is then sent to the Web server. The Web server uses the path portion to determine what content is being requested and how to access the requested content. The Web server then accesses the requested content and returns the requested content to the Web browser.

Thus, the usefulness of the WWW client/server model is highly dependent having access to appropriate URLs. That is, a user must have prior knowledge of or at least be able to easily obtain a URL for content they desire to request. Without an appropriate URL for a portion of content, a user essentially has no way to request the content. Fortunately, URLs can be obtained in a variety of ways, such as, for example, through prior access to a Website, a stored favorite, etc. Further, even without prior knowledge, URLs can be followed from links in other Web pages, obtained through search engines, etc.

Search engines can be particularly useful when a user desires to access content without having access to an appropriate URL for the content. In fact, it is quite common for users to initiate a search for content utilizing a search engine. For example, a user can enter one or more search terms into a search engine. In response, the search engine returns a list of different URLs (typically included in hyperlinks) that linking to content related to the entered search terms. The user can then select a returned URL to access content at a Website.

However, the accuracy of a search engine's search results is highly dependent on the search engine having previously obtained information indicating that a URL corresponds to content relevant to an entered search term. Thus, many search engines utilize automated programs (often referred to as crawlers, bots, spiders, etc.) that continually scan the WWW to find Websites and index Website URLs. Search engines locate and index billions of Web pages using these automated programs. Accordingly, search results often include a (potentially) large number of Websites having content relevant to entered search terms.

Unfortunately, due to the sheer volume of Websites connected to the WWW, it is relatively common for a search engine not to return one or more Websites, even though content at the Websites is relevant to entered search terms. This can occur, for example, when a Website was recently launched and an automated program has not yet indexed the Website. As such, search engines also permit Website operators to submit information that can be used to identify content from their Website in search results. For example, a Website operator can submit a domain name to a search engine. In response, the search engine directs an automated program to the domain and indexes URLs within the domain.

Although even with knowledge of a domain name, automated indexing programs may fail to completely index all the URLs of a Website. This can occur, for example, when a Website is not well connected through multiple links to other Websites or when the Website was unavailable when an automated program attempted to index the Website. Further, even if a Website is available and has well connected links, the design of the Website may be difficult to index. For example, a Website may include content (e.g., AJAX, Flash, etc.) that automated indexing programs simply can not navigate.

Thus, search engines also permit Website operators to submit Sitemaps of a Website. A Sitemap includes information about URLs on a Website that are available for crawling. A Sitemap can identify URLs that an automated indexing program may otherwise be unable to reach using typically indexing algorithms. For example, a Sitemap can be an eXstenible Markup Language ("XML") file that lists URLs for a Website. Sitemaps can also include additional information about each URL, such as, for example, when content at the URL was last updated, how often content at the URL is updated, how important the URL is relative to other URLs at the Website, specific keywords related to the URL, etc.

Sitemaps can be generated manually or through the use of various automated tools. For example, some search engines provide Sitemap creation tools in the form of scripts. The scripts read different types of data, such, for example, URL lists, web server directories, and access logs, and create Sitemaps from the data. Accordingly, the use of Sitemaps allows automated indexing programs to more intelligently index a Website.

However, the design of some Web pages makes it difficult and time consuming to accurately and completely represent a Website using a Sitemap. For example, many Web based applications have dynamic Web pages that generate multiple instances of a Web page based on dynamic data. The dynamic data can include query strings or other data access mechanisms for accessing data from arbitrary data sources. As a result, this dynamic data is typically represented in an incomplete manner (if even represented at all) in existing types of data provided to automated Sitemap creation tools. Accordingly, it is difficult to accurately represent Web pages including dynamic data in a Sitemap.

Thus, a Website operator is required to independently manage significant amounts of information for a Sitemap to complete the Sitemap for their Web site. Dynamic data can also change frequently causing a constant burden on the Website operator to update the Sitemap. For example, each time a row or column is changed in a database (or other data source) that provides data to a Web page, the Web site operator is typically required to also manually update a corresponding Sitemap and/or re-run any automated mechanism to reflect the data change in a Sitemap. The updated Sitemap is then made available in anticipation of an automated indexing program subsequently re-indexing the Website.

BRIEF SUMMARY

The present invention extends to methods, systems, and computer program products for dynamic sitemap creation. A Web server indicates the location of a Sitemap creation handler to the search engine crawler. The search engine crawler receives the handler location and subsequently requests a sitemap for a Website from the Web server.

The Web server receives the subsequent request from the search engine crawler for a Sitemap for the Website. The Sitemap creation handler refers to a configuration file to identify an application code class defining a format for accessing data from a dynamic data collection and at least a portion of a Uniform Resource Locator path. The portion of the Uniform Resource Locator path identifying a script used to generate the multiple instances of the Web page.

The Sitemap creation handler and the application code class interoperate to generate a query string to access a plurality of data items from the dynamic data collection using the defined format. The accessed plurality of data is used to generate at least some of the multiple instances of the Web page. The Sitemap creation handler automatically creates Sitemap entries for each data item in the plurality of data items.

Each Sitemap entry includes at least a Uniform Resource Locator (URL). The URL includes the portion of the Uniform Resource Locator path identified from the configuration file and the query string for accessing the data item from the dynamic data collection. The automatically created Sitemap entries are inserted into a Sitemap for the Website. The Sitemap is returned to the search engine crawler in response to the request.

The search engine crawler receives the Sitemap. The search engine crawler can use the Sitemap to crawl the multiple instances of the Web page based on the accessed data items.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
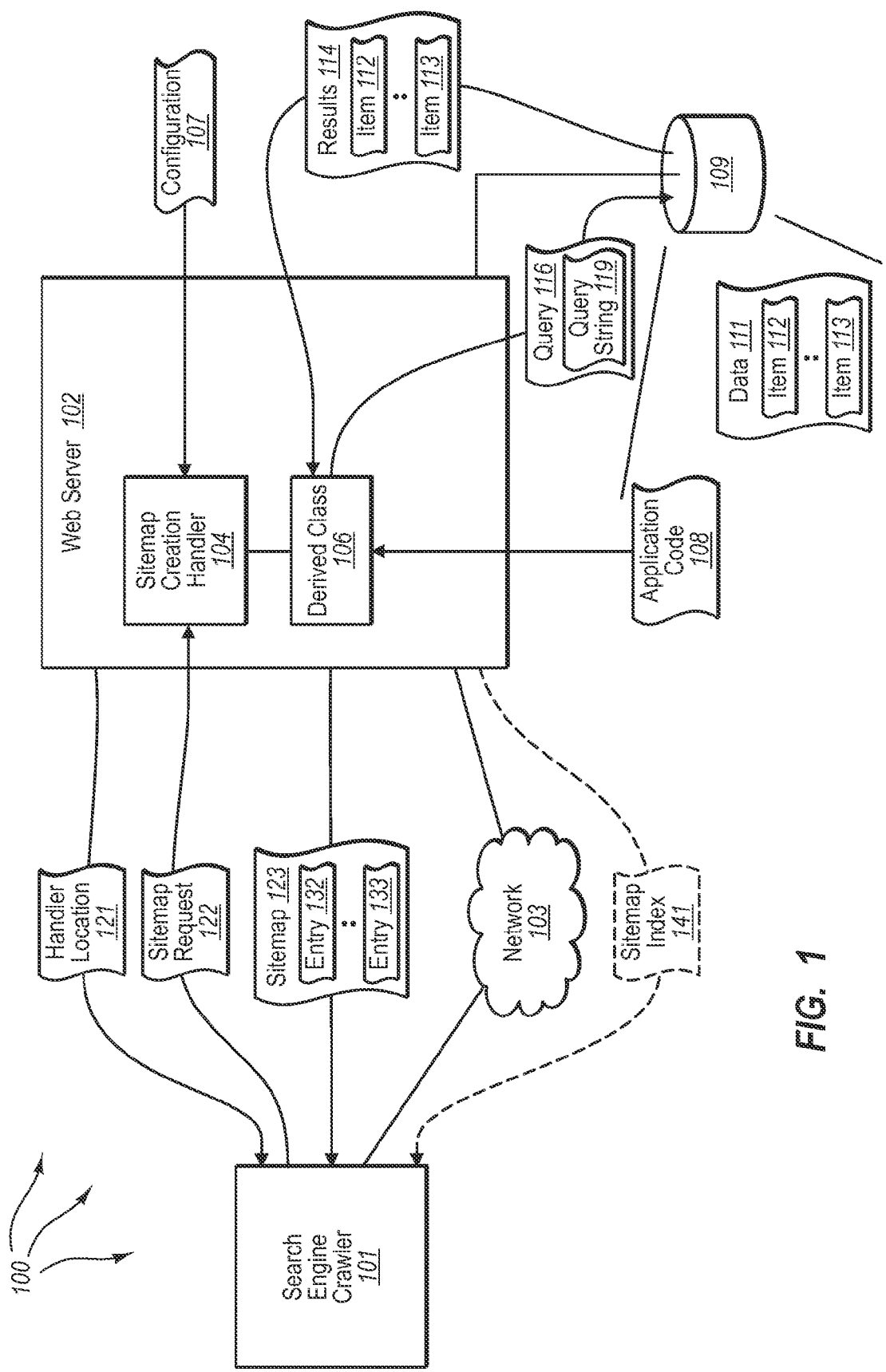
FIG. 1 depicts an example computer architecture that facilitates dynamic sitemap creation

The present invention extends to methods, systems, and computer program products for dynamic sitemap creation. A Web server indicates the location of a Sitemap creation handler to the search engine crawler. The search engine crawler receives the handler location and subsequently requests a sitemap for a Website from the Web server.

The Web server receives the subsequent request from the search engine crawler for a Sitemap for the Website. The Sitemap creation handler refers to a configuration file to identify an application code class defining a format for accessing data from a dynamic data collection and at least a portion of a Uniform Resource Locator path. The portion of the Uniform Resource Locator path identifying a script used to generate the multiple instances of the Web page.

The Sitemap creation handler and the application code class interoperate to generate a query string to access a plurality of data items from the dynamic data collection using the defined format. The accessed plurality of data is used to generate at least some of the multiple instances of the Web page. The Sitemap creation handler automatically creates Sitemap entries for each data item in the plurality of data items.

Each Sitemap entry includes at least a Uniform Resource Locator (URL). The URL includes the portion of the Uniform Resource Locator path identified from the configuration file and the query string for accessing the data item from the dynamic data collection. The automatically created Sitemap entries are inserted into a Sitemap for the Website. The Sitemap is returned to the search engine crawler in response to the request.

The search engine crawler receives the Sitemap. The search engine crawler can use the Sitemap to crawl the multiple instances of the Web page based on the accessed data items.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates dynamic Sitemap generation. Depicted in computer architecture 100 are search engine crawler 101 and Web server 102. Search engine crawler 101 and Web server 102 are connected to one another over network 103, such as, for example, a Local Area Network ("LAN"), a Wide Area Network ("WAN"), or even the Internet. Accordingly, components of search engine crawler 101 and Web server 102 as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, Web server 102 includes Sitemap creation handler 104 and configuration 107 (e.g., a Web.config file). Generally, Sitemap creation handler 104 is configured to receive Sitemap requests from search engine crawlers and return requested Sitemaps. Configuration 107 associates references to relevant portions of application code with portions of URL paths. In response to receiving a Sitemap request, Sitemap creation handler 104 accesses configuration 107 to obtain a reference to corresponding application code relevant to generating Sitemap entries responsive to the sitemap request.

Sitemap creation handler 104 interoperates with the corresponding application code to generate sitemap entries for multiple instances of a Web page, such as, for example, Web pages that include dynamic data. The interoperation of Sitemap creation handler 104 and corresponding application code can include issuing a query (or other request) for data items. Data items can be accessed from a database, some other collection of data items, or some other arbitrary data source (e.g., a Web service).

Sitemap creation handler 104 then combines the associated URL path portion with a query string for accessing a data item into a sitemap entry for the data item. Sitemap creation handler 104 then inserts any Sitemap entries into a Sitemap and returns the Sitemap to the requesting search engine crawler.

Storage 109 can store various types of data, such as, for example, application code and data, that Web server 102 utilizes.

Search engine crawler 101 can be a component of a search engine. The search engine can be configured to return URLs (e.g., in hyperlinks) to websites that contain content relevant to entered search terms. Search engine crawler 101 can parse Website generated HTML to determine what content is rendered at a Website. The search engine can use the parsing results to provide links to relevant content through matching to entered search terms.

Figure 2:
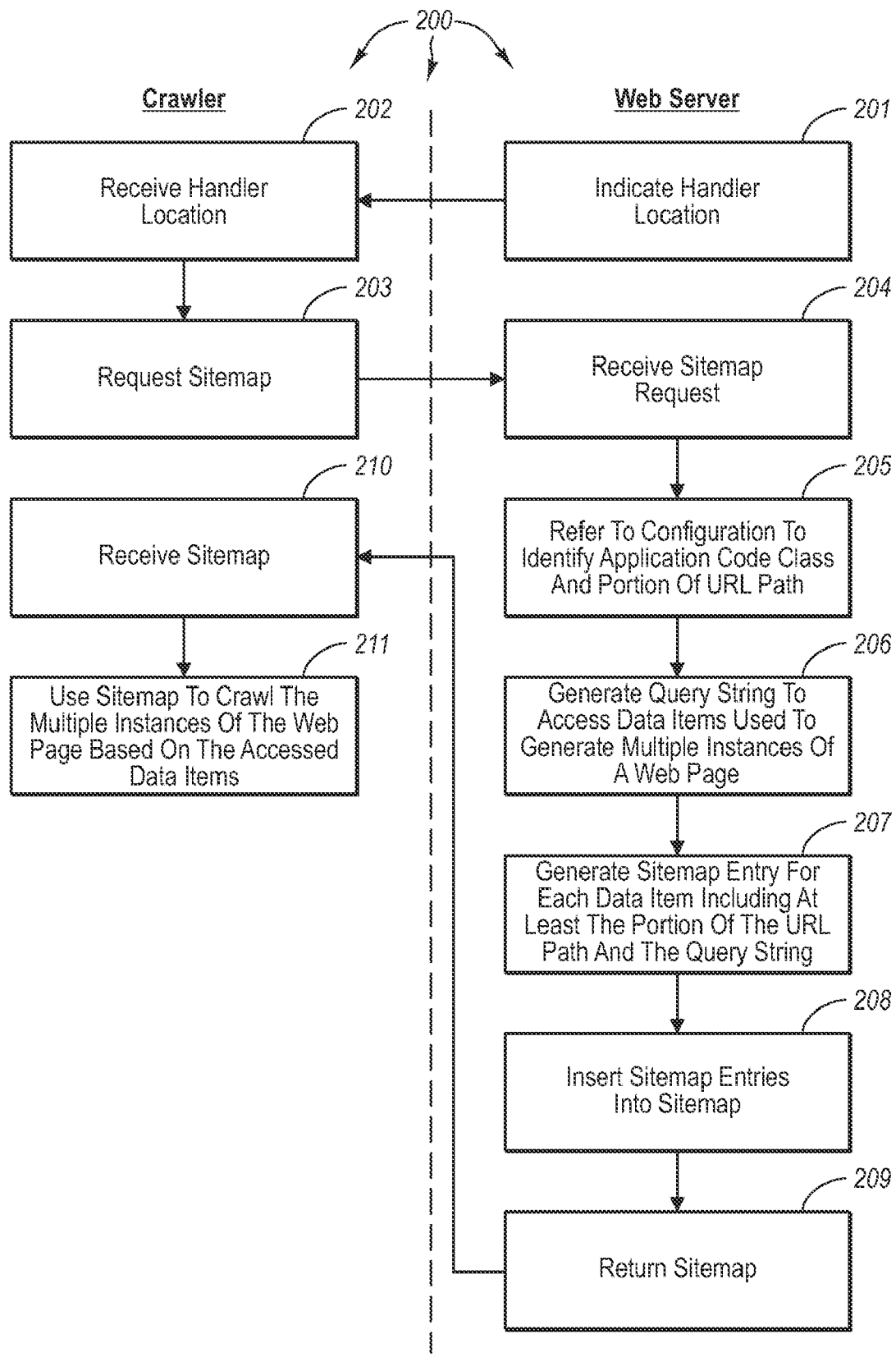
FIG. 2 illustrates a flow chart of an example method for dynamically creating a sitemap.

FIG. 2 illustrates a flow chart of an example method 200 for dynamically creating a sitemap. The method 200 will be described with respect to the components and data of computer architecture 100.

Method 200 includes an act of indicating the location of a Sitemap creation handler to the search engine crawler (act 201). For example, Web server 102 can send handler location 121 to search engine crawler 101 to indicate the location of Sitemap creation handler 104 to search engine crawler 101. Search engine crawler 101 can be a bot, spider, etc., that is configured to index Web pages. Method 200 includes an act of receiving the location of a Sitemap creation handler (act 202). For example, search engine crawler 101 can receive handler location 121 from Web server 102. Thus, search engine crawler 101 is provided a location that can be used to obtain a Sitemap from Web server 102 (e.g., of a plurality of Web pages in a domain Web server 102 manages).

Handler location 102 can include a URL, such as, for example, of the format http://<Website>/<Name of Handler>. The "<Website>" portion of the URL identifies a domain (e.g., www.exampledomain.org) and the "<Name of Handler>" specifies the name of a file (e.g., SearchSiteMapx-.axd) at the top level of the identified domain. In some embodiments, the specified name refers to an ASP.NET handler at Web server 102.

The following code example shows a configuration file (e.g., Web.config) referencing to a Sitemap creation handler:

```
1.   <web.preview>
2.     <searchSiteMap enabled="true">
3.       <providers>
4.         <add name="Navigation"
5.         type="
     Web.Preview.Search.AspNetSiteMapSearchSiteMapProvider,
     Web.Preview"/>
         ...
6.       </providers>
7.     </searchSiteMap>
8.   </web.preview>
9.   <system.web>
10.    <httpHandlers>
         ...
11.      <add verb="*" path="SearchSiteMaps.axd"
         type="Web.Preview.Search.SearchSiteMapHandler"
         validate="True"/>
         ...
12.    </httpHandlers>
13.  </system.web>
...
```

As depicted at lines 10-12, the configuration file defines a handler at the the path SearchSiteMaps.axd and having the type Web.Preview.Search.SearchSiteMapHandler Method 200 includes an act of requesting a Sitemap (act 203). For example, search engine crawler 101 can subsequently issue (e.g., when sufficient resources are available) sitemap request 122 to Sitemap creation handler 104. Sitemap request 102 can include handler location 121 that is resolved to Sitemap handler 104. Sitemap request 104 can be a request for a Sitemap of a plurality of Web pages in the identified domain. Method 200 includes an act of receiving a subsequent request from the search engine crawler for a Sitemap for the Website (act 204). For example, Sitemap creation handler 104 can receive Sitemap request 122 from search engine crawler 101.

Method 200 includes an act of the Sitemap creation handler referring to a configuration file (act 205). The Sitemap creation handler can refer to the configuration file to identify an application code class defining a format for accessing data from the dynamic data collection and at least a portion of a Uniform Resource Locator path. The portion of the Uniform Resource Locator path identifies a script used to generate the multiple instances of the Web page.

For example, Sitemap creation handler 104 can refer to configuration 107. Configuration 107 can identify an application code class defining a format for accessing data from data 111. Configuration 107 can also associate application code with a corresponding at least a portion of a URL that identifies a script. The identified script can be a script that Web server 102 uses to generate multiple instances of a Web page from data in data 111.

The following code example shows ways a configuration file (e.g., Web.config) can be used to facilitate creation of a Sitemap for dynamic data:

```
<web.preview>
  <searchSiteMap enabled="true">
    <providers>
      <add name="Navigation"
      type="Web.Preview.Search.-
AspNetSiteMapSearchSiteMapProvider, Microsoft.Web.Preview"/>
A.    <add name="Supplier"
        type="SupplierSiteMapData,
        App_Code"
        targetUrl="Supplier.aspx"
      />
B.    <add name="Supplier2"
        type="SupplierSiteMapData, App_Code"
        targetUrl="Supplier.aspx"
        targetUrlseparator="#"
      />
C.    <add name="Category"
        type="CategorySiteMapData, App_Code"
        targetUrl="Category_ajax.aspx"
        queryStringDataFields="CategoryID,CategoryName"
      />
D.    <add name="Category2"
        type="CategorySiteMapData, App_Code"
        targetUrl="Category_ajax.aspx"
        queryStringDataFormatString=
        "CategoryID={0}&CategoryName={1}"
        queryStringDataFields="CategoryID,CategoryName"
      />
E.    <add name="Product"
        type="ProductSiteMapData, App_Code"
        targetUrl="Product.aspx"
        pathInfoFormat="true"
        queryStringDataFields="ProductID"
      />
    </providers>
  </searchSiteMap>
</ web.preview>
<system.web>
  <httpHandlers>
    ...
    <add verb="*" path="SearchSiteMaps.axd"
type="Web.Preview.Search.SearchSiteMapHandler" validate="True"/>
    ...
  </httpHandlers>
</system.web>
```

Code blocks A, B, C, D, and E collectively represent a provider list of derived classes that can be used to access data items. Derived classes can be utilized in different ways to provide Sitemaps for different portions of data. For example, code blocks A and B both refer to the SupplierSiteMapData class. Different properties can also be included to configure how Sitemap entries for returned data are created. Derived classes can be derived from a base class, such as, for example, DynamicDataSearchSiteMapProvider, that provides generic functionality for accessing dynamic data. The derived classes can be included in the application code directory of Web server 102.

Various different properties (some depicted in the code example and some not depicted in the code example) can be included in a configuration file and used to customize Sitemap entry creation, including, but not limited to:

1) A targetUrl property that specifies the URL of the page in the Sitemap.

2) A targetUrlseparator property (optional) that specifies the separator between the URL and the data fields (e.g., ?). Characters including but not limited to # or / can also be specified.

3) A queryStringDataFormatString property (optional) that specifies how the data field are formatted using the String.Format syntax. If not specified the provider can auto-generate.

4) A queryStringDataFields property (optional) that specifies which columns you want to data bind in targetUrlFormatString. If not specified the provider can auto-generate the list of column names from the collection returned from DataQuery.

5) A lastModifiedDataField property (optional) that specifies the last modified date time column. This date can be in W3C Datetime format. The WC3 format allows omitting the time portion, if desired, to use YYYY-MM-DD. If not specified the provider can look for a property named SiteMapLastModified from a derived class.

6) A changeFrequencyDataField property (optional) specifies how frequently the page is likely to change. Example valid values include: always, hourly, daily, weekly, monthly, yearly, never. If not specified the provider can look for a property named SiteMapChangeFrequency from a derived class.

7) A priorityDataField property (optional) that specifies the priority of this URL relative to other URLs on at Website. Valid values can range from 0.0 to 1.0. If not specified the provider can look for a property named SiteMapPriority from a derived class.

8) A pathInfoFormat property (optional) that can be set to TRUE to use the value in the URL (e.g., http://site/page.aspx/1).

Subsequent to accessing configuration 107, Sitemap creation handler 104 can load a referenced class. For example, Sitemap creation handler 104 can load derived class 106 (e.g., SupplierSiteMapData, CategorySiteMapData, etc.) from application code 108.

A derived class can include various methods, including DataQuery methods, for accessing data for inclusion in a created Sitemap. The following second code example depicts an example derived class.

```
using System;
using System.Collections;
using System.Collections.Generic;
using System.Collections.Specialized;
using System.Data;
using System.Data.DLinq;
using System.IO;
using System.Text;
using System.Web;
using System.Query;
using System.Xml;
using Web.Preview.Search;
public class SupplierEntry
{
  public String SupplierID;
  public String SupplierName;
  public String SiteMapLastModified;
  public String SiteMapChangeFrequency;
  public String SiteMapPriority;
}
public class SupplierSiteMapData : DynamicDataSearchSiteMapProvider
{
  public override IEnumerable DataQuery( )
  {
    List list = new List( );
    SupplierEntry s1 = new SupplierEntry( );
    s1.SupplierID = "3";
    s1.SupplierName = "Grandma Kelly's Homestead";
    s1.SiteMapLastModified = DateTime.UtcNow.ToString("yyyy-MM-ddThh:mm:ss.fffZ");
    s1.SiteMapChangeFrequency ="weekly";
    s1.SiteMapPriority ="0.4";
    list.Add(s1);
    SupplierEntry s2 = new SupplierEntry( );
    s2.SupplierID = "8";
    s2.SupplierName = "Specialty Biscuits, Ltd.";
    s2.SiteMapLastModified = " ";
    s2.SiteMapChangeFrequency ="monthly";
    s2.SiteMapPriority ="0.7";
    list.Add(s2);
    return list.ToArray( );
  }
}
```

As depicted, the derived class SupplierSiteMapData is derived from DynamicDataSearchSiteMapProvider. The derived class also includes a DataQuery method that can be used to populate a list for return to Sitemap creation handler 104. The DataQuery method can also include properties that supplement and/or override properties included in configuration 107. The example derived class retrieves two Supplier entries (s1 and s2), assigns various different Sitemap related properties to each of the two Supplier entries, and returns the two Supplier entries and associated properties in a list.

Method 200 includes an act of the Sitemap creation handler and the application code class interoperating to generate a query string to access a plurality of data items from the dynamic data collection using the defined format, the accessed plurality of data being data used to generate at least some of the multiple instances of the Web page (act 206). For example, Sitemap creation handler 104 and derived class 106 can interoperate to submit query 116 (e.g., through a DataQuery method) to data 111. Data 111 represents a database, items in some other collection of data, data from a Web service, etc.

Query 116 includes query string 119 defining a format for use with derived class 106. If included in configuration file 107 (e.g., as in code block D above), a query string can be defined in accordance with a queryStringDataFormatString property. Otherwise (e.g., as in code block A above), derived class 106 can automatically generate a defined format for use.

In response to query 116, results 114 can be returned. Results 114 can include data items, such as, for example, items 112 (e.g., s1) and 113 (e.g., s2), that satisfied query string 119. Items 112 and 113 can be used to create at least some of the multiple instances of a Web page Web server 102 manages. For example, items 112 and 113 can represent different products from an online catalog.

A DataQuery method can be used to access data from virtually any data source, including database. Thus, a DataQuery method can implement a database query from LINQ to SQL, ADO.NET, or generated from other custom application code.

Method 200 includes an act of the Sitemap creation handler automatically creating Sitemap entries for each data item in the plurality of data items (act 207). Each sitemap entry includes at least a Uniform Resource Locator including the portion of the Uniform Resource Locator path identified from the configuration file and a query string for accessing the data item from the dynamic data collection. For example, Sitemap creation handler 104 can create entries 132 and 133 for items 112 and 113 respectively.

A sitemap entry can be a portion of eXtensible Markup Language (XML) formatted text:

```
<url>
   <loc>http://website/Supplier.aspx?view=1&ProductID=234</loc>
   <lastmod>2005-01-01</lastmod>
   <changefreq>weekly</changefreq>
   <priority>0.4</priority>
</url>
```

Within the XML formatted text Supplier.aspx refers to the Supplier.aspx contained in code blocks A and B of the example configuration file.

Method 200 includes an act of inserting the automatically generated Sitemap entries into a Sitemap for the Website (act 208). For example, Sitemap creation handler 104 can insert entries 132 and 133 into Sitemap 123. Method 200 includes an act of returning the Sitemap to the search engine crawler in response to the request (act 209). For example, Web server 102 can return Sitemap 123 to search engine crawler 101.

Method 200 includes an act of receiving a Sitemap (act 210). For example, search engine crawler 101 can receive Sitemap 123 from Web server 123. Method 200 includes an act using the Sitemap to crawl the multiple instances of the Web page based on the accessed data items (act 211). For example, search engine crawler 101 can use Sitemap 123 to request and crawl multiple instances of a Web page generated by Supplier.aspx.

That is, search engine crawler 101 can parse resulting HTML that Supplier.aspx generates for items 112, items 113, etc. Search engine crawler 101 can then match relevant terms in HTML for the specific instances of the Web page to the URLs for the specific instances of the Web page. Thus, when the search engine subsequently receives one of the relevant terms as a search term, the search engine can return the corresponding URL in search results.

Accordingly, embodiments of the present invention facilitate the placement of executable code (e.g., a Sitemap creation handler and a derived class) behind a Sitemap feed. The executable code is configured to access objects from a data source (e.g., database, other data collection, Web service, etc.) and translates the objects into XML for inclusion in a Sitemap. Sitemap properties can be included in a configuration file and/or in a derived class and preserved within Sitemap entries. Thus, a Sitemap can be created directly and automatically from data at a data source. As a result, a Sitemap can be created without having to manually re-enter data from the data source into the Sitemap.

Embodiments of the present invention can also utilize Sitemap indexes. For example, in response to sitemap request 122, Sitemap creation handler 104 can alternately return Sitemap index 141. Sitemap index 141 can identify one or more other Sitemap creation handlers at Web server 102. The one or more other Sitemap creation handlers can be configured to directly and automatically generate Sitemaps for data objects having specified properties. For example, one Sitemap creation handler can be configured to generate a Sitemap for data objects that change on a daily basis, another configured for data objects that change on a weekly basis, etc. Alternately, a Sitemap creation handler 104 can interoperate with different derived classes depending on the Sitemap that is requested. For example, Sitemap creation handler 104 can interoperate with a daily specials derived class to return a Sitemap for products listed in a Website's daily specials.

Search engine crawler 101 can use Sitemap index 141 to request a Sitemap for data objects having specified properties. For example, search engine crawler 101 can send Sitemap request 122 requesting a Sitemap for daily specials. In response, Web server 102 can return Sitemap 123 of daily specials to search engine crawler 101. Search engine crawler 101 can then re-index daily special Web pages for Web server 102. However, resources of both search engine crawler 101 and Web server 102 are preserved, since Sitemaps for data objects that change less frequently are not necessarily created.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a Website including a Web based application, the Web based application configured to generate plurality of different instances of a Web page for a domain, each different instance of the Web page generated from a corresponding different portion of data dynamic data collection accessible to the Web based application, the dynamic data collection contained in a data source within the domain, a method for returning Sitemap data for the Web based application to a search engine crawler, the method comprising: an act of indicating the location of a Sitemap creation handler to the search engine crawler; an act of receiving a subsequent request from the search engine crawler for a Sitemap for the Website; an act of the Sitemap creation handler referring to a configuration file to identify: an application code class defining a format for accessing the corresponding different portions of data from the dynamic data collection for generating each of the plurality of different instances of the Web page that are to be generated for the domain; and at least a portion of a Uniform Resource Locator path, the portion of the Uniform Resource Locator path identifying a script used to generate the plurality of different instances of the Web page from the corresponding different portions of data for the domain; an act of the Sitemap creation handler automatically creating a Sitemap entry for each different instance of the Web page in the plurality of different instances of the Web page, including for each different instance of the Web page:

an act of selecting one or more customization properties for indicating one or more of: how the search engine crawler is to interpret the Uniform Resource Locator and update characteristics of the corresponding different portion of data; and an act of the Sitemap creation handler and the application code class interoperating to generate a query string to- for accessing the corresponding different portion of data from the dynamic data collection using the defined format, an act of formulating a Uniform Resource Locator for accessing the corresponding different portion of data corresponding to the instance of the Webpage in a format parseable by the search engine crawler, the Uniform Resource Locator including (a) a domain portion identifying the domain, (b) the portion of the Uniform Resource Locator path file identifying the script and (c) the query string for accessing the corresponding different portion of data from the dynamic data collection; and an act of inserting the Uniform Resource Locator into the Sitemap entry for the different instance of the Web page; wherein the act of inserting the Uniform Resource Locator into the Sitemap entry for the different instance of the Web page comprises an act of inserting the Uniform Resource Locator along with the one or more customization properties each into the Sitemap entry;

an act of inserting the automatically created Sitemap entry for each of the plurality of different instances of the Web page into a Sitemap for the Website; and an act of returning the Sitemap to the search engine crawler in response to the request.

2. The method as recited in claim 1, wherein the act of indicating the location of a Sitemap creation handler to the search engine crawler comprises the act of sending a Sitemap index to the Web engine crawler.

3. The method as recited in claim 1, wherein an act of the Sitemap creation handler referring to a configuration file comprises an act of referring to the configuration file to identify properties used to customize Sitemap entries.

4. The method as recited in claim 1, wherein the act of the Sitemap creation handler and the application code class interoperating to use a query string to access the corresponding different portion of data a plurality of data items from the dynamic data collection comprises an act of accessing a plurality of data items from a database.

5. The method as recited in claim 1, wherein the act of the Sitemap creation handler and the application code class interoperating to use a query string to access the corresponding different portion of data from the dynamic data collection comprises an act of accessing a plurality of data items from a Web service.

6. The method as recited in claim 1, wherein an act of the Sitemap creation handler automatically creating a Sitemap entry for each different instance of the Web page of data items comprises an act of creating Sitemap entries that the search engine crawler can use to access HTML text associated with each data item.

7. The method as recited in claim 1, wherein the act of selecting one or more customization properties comprises an act of selecting one or more properties indicated in derived class to customize a Sitemap entry.

8. The method as recited in claim 1, wherein the act of selecting one or more customization properties comprises an act of selecting one or more properties indicated in the configuration file.

9. The method as recited in claim 1, further comprising: an act of receiving a request for a Web page corresponding to a Sitemap entry included in the returned Sitemap.

10. A computer program product for use at a Website including a Web based application, the Web based application configured to generate a plurality of instances of a Web page for a domain, each different instance of the Web page generated from a corresponding different portion of data in a dynamic data collection accessible to the Web based application, the dynamic data collection contained in a data source within the domain, the computer program product for implementing a method for returning Sitemap data for the Web based application to a search engine crawler, the computer program product comprising one or more physical storage media having stored thereon computer-executable instructions that, when executed at a processor, cause the Website to perform the method, including the following: indicate the location of a Sitemap creation handler to the search engine crawler; receive, at the Sitemap creation handler, a subsequent request from the search engine crawler for a Sitemap for the Website; refer to a configuration file to identify: an application code class defining a format for accessing the corresponding different portions of data from the dynamic data collection for generating each of the plurality of different instances of the Web page that are to be generated for the domain; and at least a portion of a Uniform Resource Locator path, the portion of the Uniform Resource Locator path identifying a script used to generate the plurality of different instances of the Web page from the corresponding different portions of data for the domain; create a Sitemap entry for each different instances of the Web page in the plurality of different instances of the Web page, including for each different instance of the Web page:

selecting one or more customization properties for indicating one or more of." how the search engine crawler is to interpret the Uniform Resource Locator and update characteristics of the corresponding different portion of data; and generating a query string for accessing the corresponding different portion of data from the dynamic data collection using the defined format, formulating a Uniform Resource Locator for accessing the corresponding different portion of data corresponding to the instance of the Web page in a format parseable by the search engine crawler, the Uniform Resource Locator including (a) a domain portion identifying the domain, (b) the portion of the Uniform Resource Locator path identifying the script and (c) the query string for accessing the corresponding different portion of data item-from the dynamic data collection; and inserting the Uniform Resource Locator into the Sitemap entry for the different instance of the Web page;

insert the created Sitemap entry for each of the plurality of different instances of the Web page into a Sitemap for the Website; wherein computer-executable instructions that, when executed, cause the Website to insert the Uniform Resource Locator into the Sitemap entry for the different instance of the Web page comprise computer-executable instructions that, when executed, cause the Website to insert the Uniform Resource Locator along with the one or more customization properties into the Sitemap entry;

and return the Sitemap to the search engine crawler in response to the request.

11. The computer program product as recited in claim 10, wherein computer-executable instructions that, when executed, cause the Website to indicate the location of a Sitemap creation handler to the search engine crawler comprise computer-executable instructions that, when executed, cause the Website to send a Sitemap index to the Web engine crawler.

12. The computer program product as recited in claim 10, wherein computer-executable instructions that, when executed, cause the Website to refer to a configuration file comprise computer-executable instructions that, when executed, cause the Website to refer to the configuration file to identify properties used to customize Sitemap entries.

13. The computer program product as recited in claim 10, wherein computer-executable instructions that, when executed, cause the Website to create a Sitemap entry for each different instance of the Web page comprise computer-executable instructions that, when executed, cause the Website to create Sitemap entries that the search engine crawler can use to access HTML text associated with each data item.

14. The computer program product as recited in claim 10, further comprising computer-executable instructions that, when executed, cause the Website to receive a request for a Web page corresponding to a Sitemap entry included in the returned Sitemap.

15. A networked computer system, the networked computer system comprising: a Web server configured to generate a plurality of instances of a Web page for a domain, each different instance of the Web page generated from a corresponding different portion of data in a dynamic data collection contained at a data source accessible to the Web based application, the dynamic data collection contained in a data source within the domain, the Web server including: one or more processors; system memory; and one or more physical storage media having stored thereon a Sitemap creation handler; and a search engine configured to return URLs to websites that contain content relevant to entered search terms, the search engine including one or more processors; system memory; and one or more physical storage media having stored thereon a search engine crawler; and wherein the Sitemap creation handler configured to: indicate the location of a Sitemap creation handler to the search engine crawler; receive a subsequent request from the search engine crawler for a Sitemap for the Website; refer to a configuration file to identify: an application code class defining a format for accessing the corresponding different portions of data from the dynamic data collection for generating each of the plurality of different instances of the Web page that are to be generated for the domain; and at least a portion of a Uniform Resource Locator path, the portion of the Uniform Resource Locator path identifying a script used to generate the plurality of different instances of the Web page. from the corresponding different portions of data for the domain; create a Sitemap entry for each different instance of the Web page in the plurality of different instances of the Web page, including for each different instance of the Web page:

selecting one or more customization properties for indicating one or more of:" how the search engine crawler is to interpret the Uniform Resource Locator and update characteristics of the corresponding different portion of data; and generating a query string for accessing the corresponding different portion of data from the dynamic data collection using the defined format, formulating a Uniform Resource Locator for accessing the corresponding different portion of data corresponding to the instance of the Web page in a format parseable by the search engine crawler, the Uniform Resource Locator including (a) a domain portion identifying the domain, (b) the portion of the Uniform Resource Locator path identifying the script and (c) the query string for accessing the corresponding different portion of data from the dynamic data collection;

and inserting the Uniform Resource Locator into a Sitemap entry for the different instance of the Web page;

wherein computer-executable instructions that, when executed, cause the Website to insert the Uniform Resource Locator into the Sitemap entry for the different instance of the Web page comprise computer-executable instructions that, when executed, cause the Website to insert the Uniform Resource Locator along with the one or more customization properties into the Sitemap entry.

insert the created Sitemap entry for each of the plurality of different instances of the Web page into a Sitemap for the Website; return the Sitemap to the search engine crawler in response to the request; and wherein the search engine crawler is configured to: receive the location of a Sitemap creation handler from the Sitemap creation handler; submit a subsequent request to the Sitemap creation handler for a Sitemap for the Website; receive the Sitemap from the Web server; and use the Sitemap to index the plurality of instances of the Web page based on the items the corresponding different portions of data for use in matching instances of the Web page to user entered search terms.

16. The system as recited in claim 15, wherein the search engine crawler being configured to use the Sitemap to index plurality of different instances of the Web page comprises the search engine crawler being configured to parse HTML text for relevant terms to associate with a URL.

* * * * *